United States Patent [19]
Bruno et al.

[11] 3,849,119
[45] *Nov. 19, 1974

[54] TREATMENT OF MOLTEN ALUMINUM WITH AN IMPELLER

[75] Inventors: Marshall J. Bruno, Greensburg; Noel Jarrett, Lower Burrell; Burl L. Slaugenhaupt, Apollo, all of Pa.

[73] Assignee: Aluminum Company of America, Pittsburgh, Pa.

[*] Notice: The portion of the term of this patent subsequent to Sept. 23, 1990, has been disclaimed.

[22] Filed: July 5, 1973

[21] Appl. No.: 376,703

Related U.S. Application Data

[63] Continuation-in-part of Ser. No. 195,772, Nov. 4, 1971, Pat. No. 3,767,382.

[52] U.S. Cl............................. 75/68 R, 75/93 AC
[51] Int. Cl............................................ C22b 21/06
[58] Field of Search .............. 75/68 R, 93 R, 93 AC

[56] References Cited
UNITED STATES PATENTS

| | | | |
|---|---|---|---|
| 1,524,470 | 1/1925 | Beielstein | 75/68 R X |
| 1,754,788 | 4/1930 | Gann | 75/67 A |
| 2,195,217 | 3/1940 | Lindenberger et al | 75/68 R |
| 2,786,755 | 3/1957 | Paddock et al. | 75/93 R X |
| 2,987,391 | 6/1961 | Foster | 75/68 R |
| 3,400,923 | 9/1968 | Howie et al | 75/68 R X |
| 3,650,730 | 3/1972 | Derham | 75/68 R |

FOREIGN PATENTS OR APPLICATIONS

| | | | |
|---|---|---|---|
| 935,191 | 1963 | Great Britain | 75/68 R |
| 981,795 | 1965 | Great Britain | 75/68 R |

Primary Examiner—L. Dewayne Rutledge
Assistant Examiner—M. J. Andrews
Attorney, Agent, or Firm—Carl R. Lippert

[57] ABSTRACT

Molten aluminum is treated with selectively maintained salt flux in a compact efficient system to decrease its oxide, gas and sodium content. Gas removal is further aided by stripping with a non-reactive stripping gas. The system features an intensely agitated zone for contacting the metal and the salt flux followed by a quiet separation zone. Molten metal introduction, agitation and flux characteristics are utilized to achieve the required efficiencies.

30 Claims, 4 Drawing Figures

TREATMENT OF MOLTEN ALUMINUM WITH AN IMPELLER

This is a continuation-in-part of U.S. Ser. No. 195,772, filed Nov. 4, 1971 now U.S. Pat. No. 3,767,382.

It has been appreciated in the aluminum production arts that sound products and good operating economics require that the metal first be treated to reduce certain types of defects and impurities prior to casting especially of ingots which are worked to produce wrought products. One impurity commonly encountered is gas which is entrapped or dissolved in the metal during its melting and transfer. The gas is primarily hydrogen probably generated by moisture contacting the aluminum while molten. Likewise oxide is picked up on the surface of the molten aluminum which oxidizes quite readily. Upon solidification, a considerable amount of gas and oxide particles are trapped within the solidified metal. In the subsequent fabrication such entrapped impurities develop voids or discontinuities within the metal. The problem becomes more acute in higher strength aluminum products where voids and discontinuities not only create areas of weakness but can give rise to further defects which may constitute sufficient cause to reject the final product.

Another impurity commonly present in aluminum is dissolved sodium. While sodium, in the amounts generally encountered in aluminum, may not create severe difficulties in the final product itself, even miniscule amounts of sodium give rise to serious problems in rolling and other drastic working operations especially in alloys containing magnesium. For instance, as little as 0.001 percent sodium can cause very serious edge cracking in the rolling of aluminum containing 2 to 10 percent magnesium in a hot reversing mill.

Various methods have been proposed to reduce the oxide and gas content of molten aluminum and in this connection reference is made to U. S. Pat. No. 3,039,864 granted to Paul D. Hess, Kenneth J. Brondyke and Noel Jarrett wherein a process is described to reduce the oxide and gas content of molten aluminum by moving it through a refractory body bed in counterflow relation with a stripping gas which may be argon or another inert gas. This process has been successful in reducing the oxide and hydrogen gas content of molten aluminum but does not have a great effect on the sodium content. Sodium is often removed by furnace fluxing wherein vast amounts of chlorine gas are bubbled through a molten aluminum bath in a fluxing furnace to reduce sodium, gas and oxides. Through advancements in this art the sodium level can be reduced in production facilities to levels as low as 0.0005 percent. This, however, produces an enormous amount of chlorine or chlorinaceous fumes which give rise to serious pollution problems. It has been found that if the sodium content could be reduced to 0.0002 percent or less and especially to 0.0001 percent or less, on a commercial rather than mere laboratory basis, marked improvements in hot rolling could be realized such that heavy reductions of 20 percent or more per roll pass at temperatures of about 750°F or more can be readily employed even on relatively thick stock without extensive edge cracking. In addition, such very low sodium levels foster increases of 20 percent or more in continuous casting rates for aluminum ingots. However, reaching such very low levels of sodium becomes extremely difficult and employing the existing chlorine fluxing techniques can result in the evolution of enormous amounts of toxic fumes. It is also known to treat molten aluminum with salt fluxes which largely serve to reduce the oxide content but these processes are marked by disadvantages in efficiency and economy and generally do not seriously affect the sodium or gas content.

In view of the foregoing, it is obviously desirable to be able to reduce all three mentioned types of impurities, oxide particles, trapped gas and sodium, in a continuous process and at a single station or operation. It is also highly desirable that any such process be compatible with existing level pour molten metal transfer systems. As is known, aluminum's affinity for oxygen has fostered widespread use in the aluminum industry of substantially level molten metal transfer systems to avoid the turbulence and surface agitation, and resulting oxide formation, which could be encountered if the metal were permitted to drop significant heights during transfer.

STATEMENT OF THE INVENTION

According to the invention, a highly efficient system is provided for reducing the content of oxide particles, entrapped gas and sodium in molten aluminum in a compact system which can be employed in existing level pour molten metal transfer systems or, where desired, in a system having a substantial drop in elevation or molten metal height. When referring to aluminum, such is intended to include aluminum and its alloys. According to the invention a properly selected and maintained salt flux when properly mixed with the molten aluminum serves to drastically reduce the sodium and oxide contents of the molten aluminum and also operates to reduce the entrapped gas content. The gas content can be further reduced by employing a stripping type gas in the mixed metal-salt bath.

DETAILED DESCRIPTION

In the following description reference is made to the drawings in which.

Figure 1:
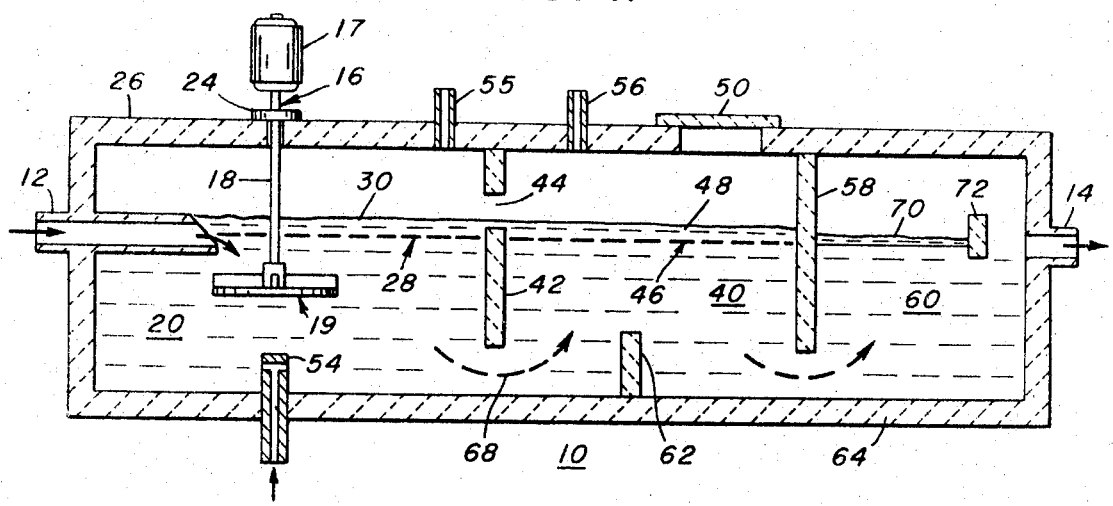
FIG. 1 is a schematic elevation illustrating a preferred embodiment of the invention.
Figure 2:
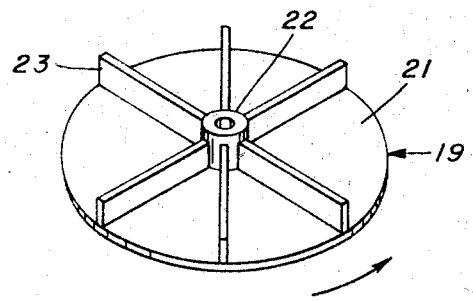
FIG. 2 is an isometric view illustrating an agitator blade used in the practice of the invention.

Referring now to FIG. 1, there is shown a system 10 for purifying molten aluminum which enters through inlet pipe 12 and exits through outlet pipe 14. The system is divided into three zones, a mixing zone 20, a separation zone 40 and a discharge zone 60. The mixing zone includes an agitator 16 including a motor 17, a shaft 18 and an impeller 19. Referring briefly to FIG. 2, the impeller 19 is a vaned disc type having a horizontal disc 21, an upstanding hub 22 and upstanding vanes 23 radiating from the hub 22 and situated normal with respect to the horizontal disc 21. Returning to FIG. 1, a seal 24 is provided between the agitator shaft 18 and the top portion 26 of the chamber housing the system.

Prior to starting the agitator, there is within mixing chamber 20 an interface 28 separating the molten metal from an overlying salt bath layer 30. Especially where the inlet is horizontal as shown in FIG. 1, one preferred practice of the invention situates the impeller 19 submerged in metal but just below this interface which is hereinafter designated the static or non-agitated interface, that is, the interface which prevails when the agitator is not running, but with molten metal running through the system. If the inlet 12 were closed and molten metal allowed to exit through outlet 14 the elevation of the interface would drop somewhat, typically about six inches but reference to the static or non-agitated interface is not to this lower level but rather to the higher level with metal flowing. When the agitator is running the relatively sharp interface is lost but the static condition is important since proper positioning at this point helps assure proper operation with the agitator running. Under static or non-agitated conditions the top face of the disc 21 of impeller 19 is preferably situated from 1 to 4 inches below the interface 28. In a broader sense any position from the interface, but preferably one inch therebelow, down to a level eight inches below the interface will provide the desired results.

Especially with horizontal metal introduction in the relative positions of the inlet 12 and the impeller 19 are important. It is desirable that the inlet 12 terminate at a point above the vanes 23 of the impeller 19 by some positive distance, preferably from ¼ inch to 2 inches, but not more than four or five inches. These dimensions refer to the distance separating the top of the vanes from the inside bottom of the feed tube 12. The horizontal feed aspect is highly significant in the aluminum industry which strongly favors horizontal pour molten metal transfer systems where the drop in height between inlet and outlet is not over three inches and such represents a highly important aspect of the invention which is highly suited to existing horizontal pour systems. Other embodiments feature molten metal feed in a vertical attitude or at an angle so long as the molten metal is fed onto the disc of the rotating impeller.

The mixing chamber 20 is separated from the separation chamber 40 by a baffle 42 under which molten metal can move from the mixing to the separation chamber. The baffle has one or more ports 44 through which salt flux separated from the molten metal in the separation chamber 40 is returned to the mixing chamber 20. Interface 46 separates the molten metal bath in the separation chamber 40 from the overlying layer 48 which contains salt flux and oxide particles removed from the molten metal, the salt and oxide particles separating in the separation chamber 40 and floating out of the molten metal to provide the overlying layer 48. Above chamber 40 is situated access cover 50 which permits access to the overlying layer 48 to periodically remove oxide particles therefrom for reasons explained hereinbelow.

Returning for a moment to the mixing zone 20 a gas inlet 54 is shown for introducing argon or another suitable stripping gas into the mixing zone 20. Another method of introducing gas would be through the agitator shaft 18, the gas discharging downwardly from the bottom of disc 21 or radially between vanes 23 in vaned disc impeller 19. Vents 55 and 56 are situated, respectively, above the mixing and separating zones to discharge the stripping and the stripped gases from the respective zones.

A baffle 58 separates the discharge chamber 60 from the separation chamber 40 and molten metal travels from the separation chamber to the discharge chamber 60 by moving under the baffle 58. An additional baffle 62 upstanding from the bottom 64 serves to prevent bypassing of the separation chamber 40 by the stream 68 exiting the mixing zone 20.

Discharge zone 60 is provided as a safeguard against inadvertent entrainment of salt and other non-metallic content which might escape separation zone 40. However, there is a small amount 70 of salt flux which may be situated above the molten metal in the discharge chamber 60 and a skim baffle 72 serves to prevent the salt 70 from exiting with the molten metal through discharge nozzle 14.

Concerning the materials of construction it is important that the housing or its lining for the overall system 10 be in a material which is resistant to both molten aluminum and molten salt. Suitable materials include silica-alumina or silicon carbide brick, or both, or even graphite. The gas disperser 54 may suitably be a graphite tube terminating with a porous graphite dispersing head of the type often employed for this purpose. The impeller for the agitator can suitably be graphite, alumina or silicon carbide.

In operation molten metal is fed into the mixing zone and is there shattered into streams and particles which very readily facilitate contact area with the salt flux and also any stripping gas. It is significant that at least 80 percent and preferably at least 90 percent of the metal entering the mixing chamber is fragmented into streams and particles having a dimension not greater than one-fourth inch and at least 60 percent into streams and particles under one-eighth inch. This facilitates the necessary mixing and contact efficiencies within the mixing zone 20 to achieve the desired extent of treatment in a minimum of time and volume. In this connection it should be noted that the use of a vaned disc impeller which is properly situated with respect to static metal-salt interface 28 and with respect to the molten metal introduction from inlet 12 in accordance with the guides set forth earlier facilitates the desired fragmentation of the incoming metal stream. Experiments and trials have demonstrated that a flat metal disc, regardless of rotation or elevation, is inadequate to achieve the desired fragmentation. Also it is noted that electromagnetic stirring is generally not of a character suitable to achieve this fragmentation inducing instead currents within the metal but normally very little shattering of the metal.

Subject to the described conditions with respect to agitator and inlet flow and subject to the salt composition maintenance controls set forth hereinbelow, the nominal residence time within the mixing zone 20 is considerably less than 10 minutes and is often less than four or five minutes, with three minutes or even less, for instance one minute, being realistic. This is a marked improvement over many previous treatments for the reduction of sodium wherein vast quantities of chlorine are bubbled through a furnace for a period of 30 minutes or even over an hour. The efficiencies and advantages achieved by this improvement are obvious without elaboration.

The salt flux-metal mixture comprising for the most part particles and streams of molten metal surrounded by liquid flux coatings exits the mixing zone 20 in a stream 68 passing under baffle 42 and enters the separation zone 40. This zone is maintained under comparatively quiet flow conditions to favor the separation of the molten metal from the salt flux. The flux rises to form overlying layer 48 carrying with it oxide particles and some amount of gas extracted from the molten metal together with sodium removed from the molten metal in the form of sodium chloride salt. The salt flux in the overlying layer 48 retains its low viscosity thus permitting it to easily flow and separate from the solid oxide particles which tend to settle out of the salt flux to lie on the salt-metal interface 46. Temperature is typically maintained in both the mixing and separation chambers at a level of about 1,300° to 1,500°F. This is readily accomplished by the use of immersion heaters which may be combustion type heaters or electrical heaters.

Turning now to the salt flux composition and maintenance it is advisable in practicing the invention to minimize the moisture content of the salt flux, both as initially provided in the mixing zone 20 and as subsequently added to make up any salt losses. The moisture content should not exceed 0.1 percent by weight of the salt flux. It is also highly desirable that the atmosphere above the salt-metal bath in the mixing and separation zones be maintained at a relatively dry level having a dew point of not greater than 0°F and preferably not greater than −40°F. This serves to minimize pick up of further gas from the environment above the bath and to prevent the introduction of further oxide into the bath which would interfere with the desired treatment.

In order to maintain the desired atmosphere above the melting and separation baths it is important that the system be closed to prevent atmospheric air from blanketing the baths. In the system illustrated in FIG. 1 it is clear that lid or roof portion 26 and associated structures such as baffle 58 serve to prevent atmospheric air from blanketing the treatment bath areas. Another advantage of the closed system is that the fumes which typify salt flux treatments are contained within the area above the treatment baths and do not escape to the atmosphere. For the most part the only gases exiting vents 55 and 56 are the treatment gas which enters through gas inlet 54 and the gases, for the most part hydrogen, stripped from the aluminum during the treatment. Typically the gases exiting through the vents contain less than 5 ppm of chlorinaceous gas.

In accordance with the invention it is important that the salt flux contain a substantial amount of magnesium chloride, $MgCl_2$. A suitable initial salt flux composition, that is the composition of the salt layer 30 above the molten metal bath prior to initiating the treatment, is 80 percent $MgCl_2$ and 20 percent $KCl$.

In the practice of the invention it is especially important that the magnesium chloride content of the salt be properly maintained and that the oxide content of the salt be carefully controlled. Referring again to FIG. 1 and the description of the system depicted therein set forth hereinabove, it has already been pointed out that there is a recycling of the flux contained in the layer 48 overlying the melt in the separation chamber 40 from the separation chamber 40 back to the mixing chamber 20. This is conveniently effected by the provision of return port 44 in the baffle 42 separating the mixing and separation zones. Adjustments to the salt then are conveniently made in the relatively quiet layer 48 within the separation zone 40. Access hatch 50 can be provided for such and affords ample opportunity to replenish the salt to desired quality. It is important that the oxide content within the total system 10 not exceed 20 percent. This requires that oxide which separates into the layer 48 overlying the melt in separation chamber 40 be periodically, or continuously if desired, removed to maintain the desired oxide content which, for the most part, prevails in the salt phase. That is, oxide is removed from the oxide-salt layer 48 overlying the metal within separation zone 40 to provide and maintain a condition where the oxide content throughout the system never exceeds 20 percent and preferably never exceeds 5 percent.

Another significant aspect of salt flux control is based on maintaining its chemistry. As the magnesium chloride reacts with the sodium in the melt it produces sodium chloride in the salt flux portions and it is important that sufficient magnesium chloride be added, suitably through access hatch 50, to provide and maintain a weight ratio in the salt flux of at least 4 to 1, or better 6 to 1, in favor of magnesium chloride and preferably at least 50 to 1.

The desired manipulations to the salt flux oxide layer in zone 40 are not especially difficult since the salt flux is relatively thin, having a very low viscosity, which facilitates its flow through ports 44 back into the mixing zone 20. The oxide on the other hand is an agglomerated particulate mass which is readily ladled or spooned from the overlying layer 48.

As indicated above, argon or another suitable gas may be introduced through nozzle 54 or at the agitation site itself. This gas serves to strip entrapped hydrogen or other gas from the molten metal in accordance with existing knowledge. Suitable gases include all of the so-called inert gases including helium, neon, argon, krypton xenon. Also nitrogen or carbon dioxide may be employed if desired. Mixtures of any of these gases likewise can be utilized although argon is often preferred from the standpoint of combining effectiveness and economics. The gas is preferably applied fairly close to the agitation site so as to permit the gas to be spread through the salt flux-melt mixture aided by the action of the agitator blade such that particles or bubbles of gas become intermixed within the streams and particles of salt and metal produced by the agitator. While it is highly preferable to introduce the stripping gas as just described in the mixing zone, some introduction is possible in the separation and discharge zones 40 and 60 although such should be regulated to minimize disturbance of desired quiet aspect essential to separation and avoids augmentation of gas distribution by the agitator.

If desired, in addition to or in lieu of the inert stripping gas, there may be provided some relatively small amount of chlorinaceous gas such as aluminum chloride or preferably chlorine. The chlorine then can be used to react the sodium to produce sodium chloride or to react with magnesium in the melt to replenish the supply of magnesium chloride. Obviously both effects can occur to some extent.

Further understanding of the invention and appreciation of its advantages is gained from the following illustrative example in which an aluminum alloy nominally containing 4.5 percent magnesium was treated according to the improved process. The arrangement employed was of the type depicted schematically in FIG. 1. Initially, before starting the agitator, there was a salt layer about six inches deep above the molten metal in the mixing chamber 20. The disc portion 21 of the agitator impeller 19 was positioned about 3 inches below the interface 28 between the salt layer 30 and the melt therebeneath with metal flowing through the system and the agitator not running. Horizontal inlet line 12 was positioned about one-half inch just above the outer extremity of the impeller vanes. The size of the overall system was about 4 by 6 feet and the approximate volume of mixing chamber 20 was about 12 cubic feet. The initial salt flux was substantially pure $MgCl_2$ and the moisture content was about 0.05 weight percent. The system was housed in a closed container of the type shown in FIG. 1. The impeller was run at a speed of about 300 rpm and had a diameter of about 10 inches with 8 vanes protruding upwardly about 2½ inches. Approximately 100 cubic feet per hour of argon were introduced into the mixing chamber after the system had started. About 20,000 pounds per hour of aluminum were run through this system, the nominal metal residence time being about four minutes in the mixing chamber. The table below sets forth the impurity content, before and after treatment, along with the extent of the impurity reduction for a number of runs. The oxide content was determined by the upset fracture method and vacuum density checks were made as a rough indication of gas and impurity removal.

of complete utilization of a gas which may be chlorine, the gas being maintained in a sealed blanket 130 above the bath. Any excess gas exiting the bath is recycled by being drawn through inlet ports 125 and passed downwardly through axial conduit 127 and out through impeller exit ports 136 into the low pressure areas 135 created by the cavitation type impeller 128. This recycling of any gas permits not only its complete utilization thus reducing waste but readily facilitates a completely fume-free system.

While the present improvement has been described with particular reference to removing sodium since the removal of sodium is a matter of significant importance to those presently treating molten aluminum, it is to be understood that the present improvement enables the removal of other metallic impurities in addition to, or in lieu of, removing sodium. Accordingly, the invention contemplates the removal of metallic impurities responsive to treatment with magnesium chloride and, specifically, the elements strontium, lithium, potassium and calcium by the method herein described. These metallic impurities may be present in the molten metal to be treated in the same amounts as described in connection with sodium or in greater or lesser amounts.

| Na (%) | | | Oxide (flakes/in$^2$) | | | Vacuum Density | |
|---|---|---|---|---|---|---|---|
| Before | After | % Red. | Before | After | % Red. | Before | After |
| 0.0014 | 0.0002 | 86 | 79 | 2.5 | 97 | 2.33 | 2.61 |
| 0.0012 | 0.0001 | 92 | 17 | 4 | 77 | 2.21 | 2.61 |
| 0.0008 | 0.0001 | 88 | 3 | 0 | 100 | 2.12 | 2.61 |

In each case the hydrogen content of the treated metal was under 0.15 ml per 100 g metal which is considered a very low gas content. The very low sodium levels achieved are of the type very highly desirable for the severe hot rolling reductions now desired in commercial hot rolling lines. Moreover the sodium reductions were accompanied by no magnesium reduction. Salt consumption during the runs was rather low. Within the separation chamber 40 salt flux was added at a typical rate of around 50 pounds per 8 hour shift. Oxide was removed about twice per shift. It is quite apparent that the improved system achieves high metal treatment rates and marked impurity reductions in a highly economical and easily controlled process.

Figure 3:
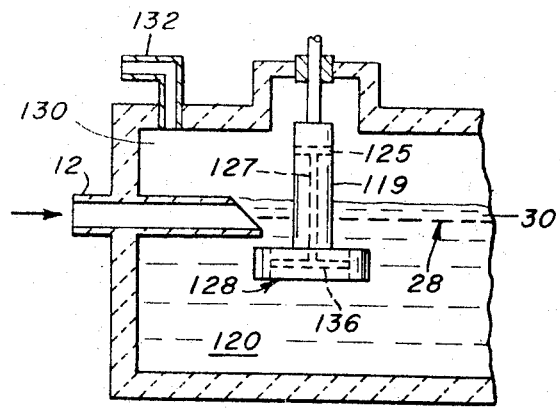
FIG. 3 is a schematic partial elevation corresponding to a portion of FIG. 1 and illustrating another embodiment.
Figure 4:
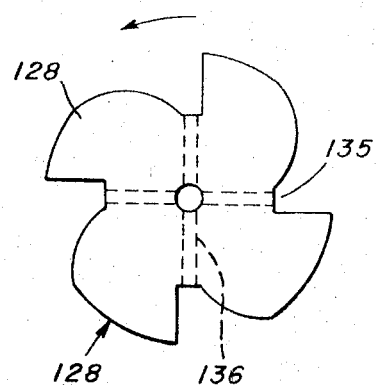
FIG. 4 is a plan view illustrating the agitator blade employed in the FIG. 3 embodiment.

As an example of one modification of the basic practice of the invention reference is made to FIG. 3 which shows a mixing chamber 120 featuring a modified impeller arrangement 119. The impeller head 128 is shown situated just below the interface 28 separating the overlying salt layer 30 from the melt body therebeneath. The impeller system 119 features gas inlet ports 125 and downward gas conduit 127 to carry the gas downward along the axis of the shaft about the impeller blade portion. Gas is maintained in the area 130 above the melt by gas inlet 132. The impeller is designed in such a way as to deliberately induce cavitation in the bath. This results in the formation of local low pressure sites as the impeller spins which causes gas to be inducted into the bath at these sites. The induction effect can be augmented to advantage in some instances by gas pressure above the melt. A suitable cavitation impeller configuration is illustrated in FIG. 4 where areas 135 serve as low pressure areas as the impeller spins in the indicated direction. This system has the advantage The molten metal after treatment would exhibit the same low levels of the impurities as it does with sodium. Also the various details and practices discussed in connection with sodium apply substantially as well for the other metallic impurities.

While the invention has been described in terms of preferred embodiments, the claimed appended hereto are intended to encompass all embodiments which fall within the spirit of the invention.

What is claimed is:

1. A continuous method of treating molten aluminum containing one or more of the metallic impurities from the group of the elements Sr, Li, K and Ca to decrease its content of oxide inclusions, hydrogen gas and one or more of said metallic impurities comprising the steps
   a. continuously introducing said molten aluminum containing said metallic impurities into an agitated zone maintained by the action of a submerged rotating vaned impeller and containing a mixture of said molten aluminum and a reactive salt flux containing magnesium chloride, said molten aluminum being introduced substantially into the rotating impeller,
   b. continuously moving a mixture comprising said molten aluminum and salt flux from said agitated zone to a separate quiet zone to substantially separate molten aluminum from the remainder of said mixture which remainder rises to form a floating salt flux-oxide layer above the separated molten aluminum,
   c. recirculating salt flux from said floating salt flux-oxide layer in said quiet separation zone to said agitated zone, and maintaining in said recirculated salt flux a maximum oxide content of 20 weight percent, d. removing a purified molten aluminum product containing reduced amounts of said metallic impurities.

2. The method according to claim 1 wherein said impeller is a vaned disc impeller having a substantially horizontal disc portion and upstanding radial vanes.

3. The method according to claim 2 wherein the disc of the impeller is situated at or below the static molten metal-salt flux interface, but not more than eight inches below said interface, which prevails in said agitated zone if the agitator is not running.

4. The method according to claim 2 wherein said molten aluminum introduction is effected by causing a stream thereof to move downwardly a short distance of not more than five inches upon said impeller.

5. A continuous method of treating molten aluminum containing one or more of the metallic impurities from the group of the elements Sr, Li, K and Ca to decrease its content of oxide inclusions, hydrogen gas and one or more of said metallic impurities comprising the steps
   a. continuously introducing said molten aluminum containing said metallic impurities into an agitated zone containing a mixture of said molten aluminum and a reactive salt flux containing magnesium chloride and not more than 1 percent moisture,
   b. the agitation being provided by the action of a rotating vaned disc impeller having a substantially horizontal disc portion and upstanding radial vanes, said molten aluminum being introduced substantially into the rotating impeller vanes, the disc of the impeller being situated at the static molten metal-salt flux interface which prevails in said agitated zone when the agitator is not running or below said interface but not more than eight inches therebelow,
   c. continuously moving a mixture comprising molten aluminum and salt flux from said agitated zone to a separate quiet zone to substantially separate molten aluminum from the remainder of said mixture which remainder rises to form a floating salt flux-oxide layer above the separated molten aluminum,
   d. recirculating salt flux from said floating salt flux-oxide layer in said quiet separation zone to said agitated zone,
   e. removing oxide from said floating salt flux-oxide layer in said quiet separation zone to provide and maintain a maximum oxide content of 20 percent within the salt flux recirculated to said agitated zone,
   f. removing a purified molten aluminum product containing reduced amounts of said metallic impurities.

6. The method according to claim 5 wherein said disc of said impeller is situated beneath the static molten metal-salt flux interface by from 1 to 4 inches.

7. The method according to claim 5 wherein the molten metal introduction is arranged in cooperation with the rotating disc impeller such that molten metal is directed substantially downwardly to the upper faces of said disc.

8. The method according to claim 5 wherein at least 90 percent of the molten metal being introduced is fragmented into multiplicities of streams and particles each having a dimension under one-fourth inch.

9. A method according to claim 8 wherein said molten metal streams and particles are fragmented such that at least 60 percent have a dimension under one-eighth inch.

10. The method according to claim 5 wherein magnesium chloride is added to the salt flux in said floating flux-oxide layer in said quiet separation zone to provide and maintain in said salt flux in said mixing zone a weight ratio of at least 4:1 of magnesium chloride to the chlorides of the said metallic impurities.

11. The method according to claim 10 wherein said weight ratio is at least 50:1.

12. The method according to claim 5 wherein said molten aluminum being treated contains up to 0.003 percent of said metallic impurities and where said removed purified aluminum product contains said metallic impurities not exceeding 0.0002 percent.

13. The method according to claim 5 wherein the molten aluminum separated in said quiet separation zone is passed through a second quiet zone to facilitate further separation of residual salt flux values therefrom after which separation the molten aluminum is removed.

14. The method according to claim 1 wherein gas is introduced to said agitated zone to strip gases from said molten aluminum being treated therein.

15. The method according to claim 14 wherein said gas comprises a non-reactive gas.

16. The method according to claim 5 wherein gas is introduced into said agitated zone to strip gases from said molten aluminum being treated therein.

17. The method according to claim 16 wherein said gas is a non-reactive gas comprising argon.

18. The method according to claim 1 wherein the agitated zone is maintained by the action of a rotary impeller having cavitation sites and provided with passages to convey gas from a blanket maintained above said salt flux-molten aluminum mixture downwardly and toward said cavitation sites such that the cavitation action inducts said gas into said agitated zone.

19. A continuous method of treating molten aluminum containing one or more of the metallic impurities from the group of the elements Sr, Li, K and Ca to decrease its content of oxide inclusions, hydrogen gas and one or more of said metallic impurities comprising the steps
   a. continuously introducing said molten aluminum containing said metallic impurities into an agitated zone maintained by the action of a rotary impeller having cavitation sites and provided with passages to convey gas from a blanket maintained above said salt flux-molten aluminum mixture downwardly and toward said cavitation sites such that the cavitation action inducts said gas into said agitated zone,
   b. continuously moving a mixture comprising molten aluminum and salt flux from said agitated zone to a quiet zone to substantially separate molten aluminum from the remainder of said mixture which remainder rises to form a floating salt flux-oxide layer above the separated molten aluminum,
   c. recirculating salt flux from said floating salt flux-oxide layer in said quiet separation zone to said agitated zone,
   d. removing a purified molten aluminum product containing reduced amounts of said metallic impurities.

20. A continuous method of treating molten aluminum containing one or more of the metallic impurities from the group of the elements Sr, Li, K and Ca to decrease its content of oxide inclusions, hydrogen gas and one or more of said metallic impurities comprising the steps a. continuously introducing said aluminum containing said metallic impurities into an agitated zone maintained by the action of a submerged rotating impeller and containing a mixture of said molten aluminum and a reactive salt flux containing magnesium chloride,
  b. introducing into said agitated zone a non-reactive gas to strip gases from said molten aluminum being treated therein,
  c. continuously moving a mixture comprising molten aluminum and salt flux from said agitated zone to a separate quiet zone to substantially separate molten aluminum from the remainder of said mixture which remainder rises to form a floating salt flux-oxide layer above the separated molten aluminum,
  d. recirculating salt flux from said floating salt flux-oxide layer in said quiet separation zone to said agitated zone,
  e. removing a purified molten aluminum product containing reduced amounts of said metallic impurities.

21. A method of treating molten aluminum containing one or more of the metallic impurities from the group of the elements Sr, Li, K and Ca to decrease its content of oxide inclusions, hydrogen gas and one or more of said metallic impurities comprising the steps a. introducing said aluminum into an agitated zone maintained by the action of a submerged rotating impeller and containing a mixture of said molten aluminum and a reactive salt flux containing magnesium chloride,
  b. introducing into said agitated zone a gas to strip dissolved gases from said molten aluminum being treated therein,
  c. continuously moving a mixture comprising molten aluminum and salt flux from said agitated zone to a quiet zone, separated from said agitated zone, to substantially separate molten aluminum from the remainder of said mixture which remainder rises to form a floating salt flux-oxide layer above the separated molten aluminum,
  d. recirculating salt flux from said floating salt flux-oxide layer in said quiet separation zone to said agitated zone,
  e. removing a purified molten aluminum product containing reduced amounts of said metallic impurities.

22. The method according to claim 21 wherein said gas comprises a non-reactive gas.

23. A method of treating molten aluminum containing one or more of the metallic impurities from the group of the elements Sr, Li, K and Ca to decrease its content of oxide inclusions, hydrogen gas and one or more of said metallic impurities in a level pour system having an inlet and an outlet disposed not more than three inches below said inlet and comprising the following steps a. introducing said aluminum containing said metallic impurities through said inlet into an agitated zone containing a mixture of said molten aluminum and a reactive salt flux containing magnesium chloride and not more than 1 percent moisture,
  b. the agitation being provided by the action of a rotating vaned disc impeller having a substantially horizontal disc portion and upstanding radial vanes, the disc of the impeller being situated at or below the static molten metal-salt flux interface which prevails in said agitated zone when the agitator is not running,
  c. said molten metal introduction being arranged in cooperation with the rotating disc impeller such that it falls downwardly a distance of up to five inches upon the upper faces of said rotating disc and wherein at least 90 percent of the molten metal being introduced is fragmented into particles and streams each having a dimension under one-fourth inch,
  d. continuously moving a mixture comprising molten aluminum and salt flux from said agitated zone to a quiet zone to substantially separate molten aluminum from the remainder of said mixture which remainder rises to form a floating salt flux-oxide layer above the separated molten aluminum,
  e. recirculating salt flux from said floating salt flux-oxide layer in said quiet separation zone to said agitated zone,
  f. removing oxide from said floating salt flux-oxide layer in said quiet separation zone to provide and maintain a maximum oxide content of 20 percent within the salt flux recirculated to said agitated zone,
  g. removing a purified molten aluminum product containing reduced amounts of said metallic impurities through said outlet.

24. The method according to claim 1 wherein in said step (c) said defined oxide content is maintained by periodically removing quantities of oxide from said floating flux-oxide layer.

25. The method according to claim 1 wherein in said step (c) said recirculated salt flux is maintained at a maximum oxide content of 5 percent.

26. The method according to claim 5 wherein in said step (e) said recirculated salt flux is maintained at a maximum oxide content of 5 percent.

27. The method according to claim 23 wherein in said step (f) said recirculated salt flux is maintained at a maximum oxide content of 5 percent.

28. The method according to claim 1 wherein the nominal residence time for the molten aluminum in the agitation zone is less than 5 minutes.

29. The method according to claim 5 wherein the nominal residence time for the molten aluminum in the agitation zone is less than 5 minutes.

30. The method according to claim 23 wherein the nominal residence time for the molten aluminum in the agitation zone is less than 5 minutes.

* * * * *